C. R. SPALDING.
AUTOMOBILE JACK.
APPLICATION FILED AUG. 7, 1914.
1,137,362.
Patented Apr. 27, 1915.
2 SHEETS—SHEET 1.
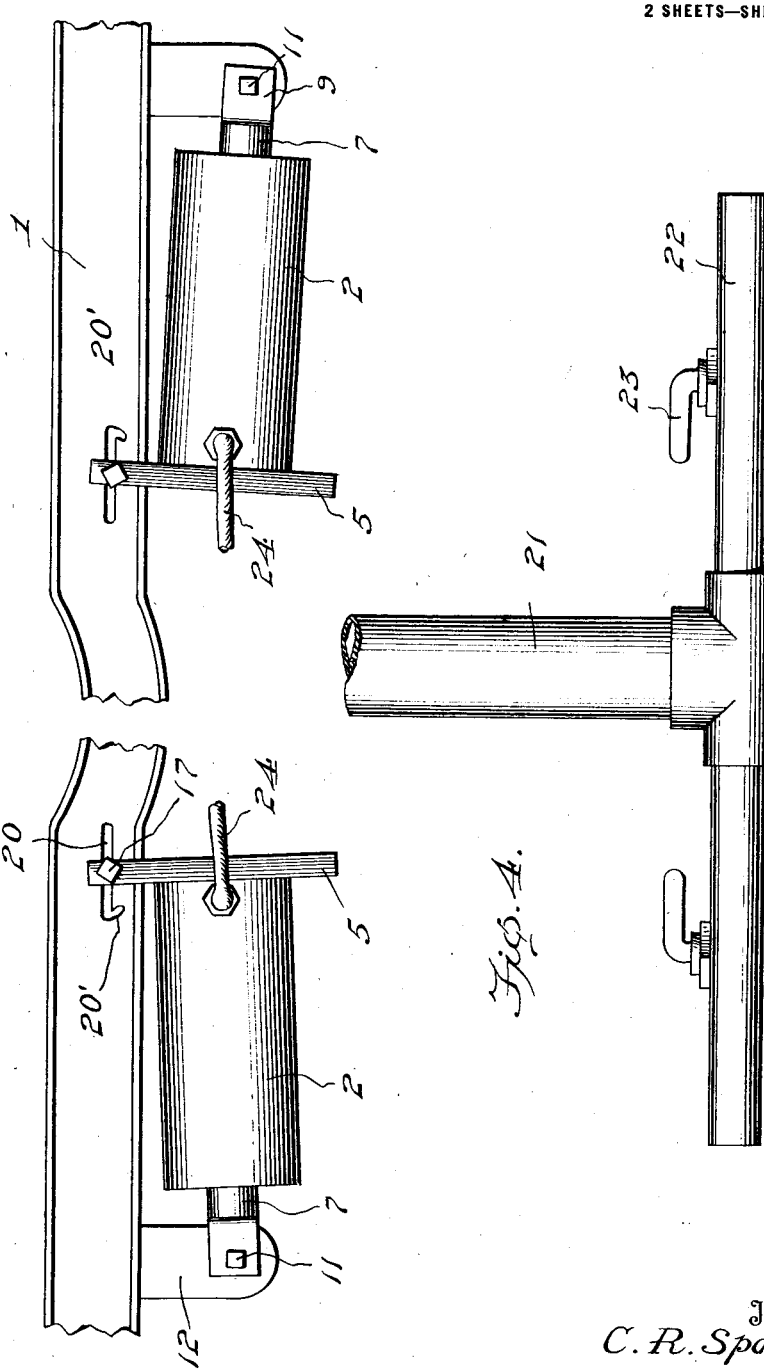
Witnesses
Paul M. Hunt
Chas. J. Chum
Inventor
C. R. Spalding.
By
Attorney

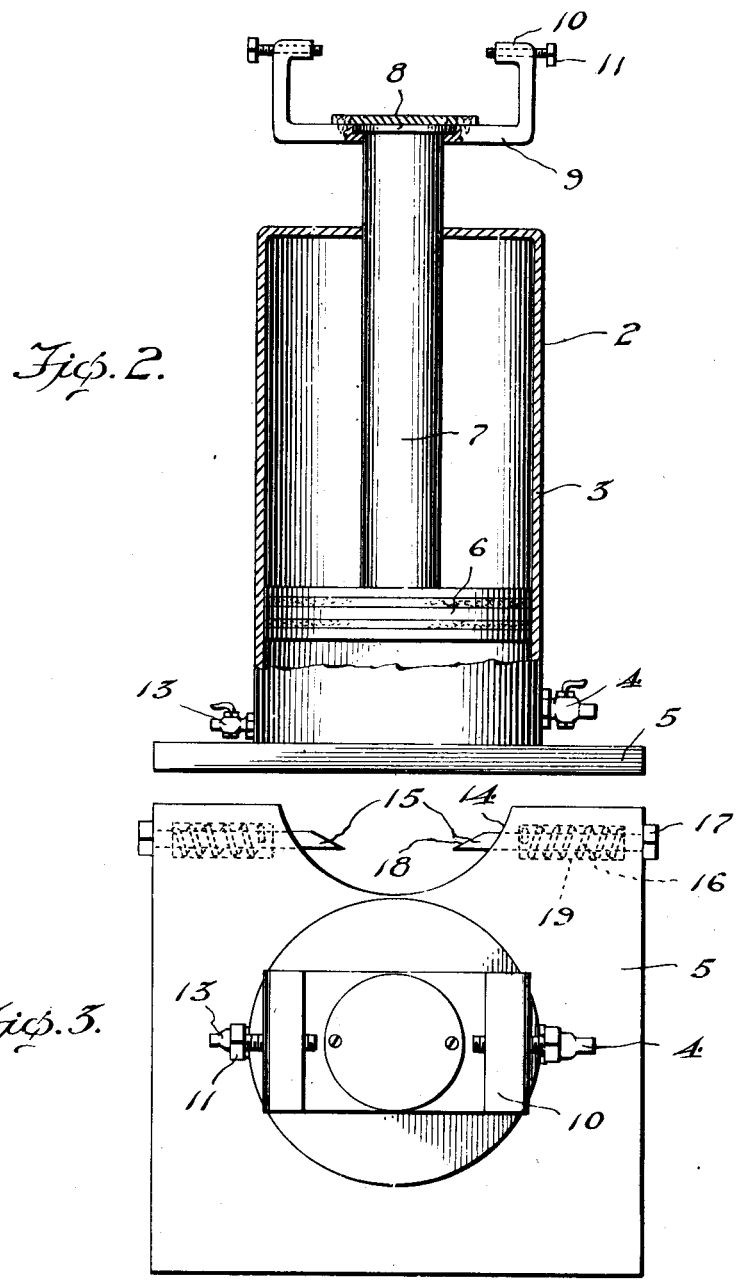

UNITED STATES PATENT OFFICE.

CHARLES R. SPALDING, OF SAFFORD, ARIZONA.

AUTOMOBILE-JACK.

1,137,362.

Specification of Letters Patent.

Patented Apr. 27, 1915.

Application filed August 7, 1914. Serial No. 855,668.

*To all whom it may concern:*

Be it known that I, CHARLES R. SPALDING, a citizen of the United States, residing at Safford, in the county of Graham and State of Arizona, have invented certain new and useful Improvements in Automobile-Jacks; and I do hereby declare the following to be a full, clear, and exact description of the invention, such as will enable others skilled in the art to which it appertains to make and use the same.

My invention relates to new and useful improvements in lifting jacks and resides in the provision of a plurality of jacks that are to be permanently secured to the axles of an automobile or similar vehicle and which may be readily operated to lift or elevate the automobile from the ground.

Another object is to provide a plurality of jacks arranged as above described and which may be easily moved into out of the way position when not in use and will not interfere with the operation of the automobile or present an unsightly appearance.

Another important object is to provide a plurality of jacks arranged as described that will serve to permit an expeditious lifting of the automobile in an easy manner and which may be operated through the medium of compressed air which may be obtained from the engine of the automobile at a low cost.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts, Figure 1 is a fragmentary front elevation of an automobile axle showing my improved jacks pivotally secured thereto, Fig. 2 is a side elevation of one of my improved jacks being broken away, Fig. 3 is a top plan view, and Fig. 4 is a fragmentary plan view of the air distributing pipe for operating the jacks.

Referring to the drawings by characters of reference, the numeral 1 designates as an entirety the front axle of an automobile. Pivoted adjacent to each end of the axle is a lifting jack designated 2 as an entirety. The rear axle of an automobile, not shown is to be equipped in the same manner with the lifting jacks.

Each of the lifting jacks consists of an operating cylinder 3 that is provided with an air inlet cock 4 adjacent to its lower end and is mounted upon a suitable base plate 5 that is preferably rectangular. Slidable within the operating chamber 3 is the piston 6 that has a piston rod 7 which is slidable within the cylinder 3 and is preferably swiveled as at 8 to the intermediate portion of a U-shaped bracket 9. The U-shaped bracket 9 is provided at its free ends with lateral inwardly extending tubular portions 10 in which are adjustably mounted pivot screws 11 that are headed and designed to be moved into pivotal relation with the axle with openings in depending attaching plates 12 carried by the axle 1 adjacent to each end.

The cylinder 3 is provided adjacent to its lower end on the side opposite to the intake 4 with an outlet valve 13 by means of which the jack may be lowered as the air is let out of the cylinder.

In the opposed edges of the plates 5 of the jacks I provide approximately semi-circular cut out portions 14 that are of sufficient size to receive a portion of the axle. Slidably mounted in opposite sides of the cut out portion 14 are latch bolts 15 that are normally held in position by means of spiral expansion springs 16 and are provided with heads 17 at their outer ends. The inner ends of the bolts are beveled or inclined as at 18 upwardly so that they may be forced past the lower part of the axle when the jack is pushed into up position. Openings 19 are formed in the plate 5 on opposite sides of the cut out portion 14 thereof to receive the springs 16. A longitudinal slot 20 is formed in the axle adjacent to each side of the center and designed to receive the beveled ends 18 of the latch bolts 15, and is provided at its outer end with a downwardly and inwardly inclined drop slot 20' to keep the jack from sliding back and forth. When the jacks 2 are moved upwardly and the lower portion of the axle is received within the cut out portion 14 of each jack, the latch bolts 15 move past the lower part of the axle and find their way into slots 20. The action of the springs forces the latch bolts into the slots and prevents falling of the jack. It will thus be seen that the jacks are supported in approximately horizontal position and in spaced relation to the ground.

Mounted in some suitable place upon the automobile is a main feed pipe 21 that is provided with a T-head 22 in each side of which is a valve 23. This pipe 21 is suitably connected with a source of compressed air supply that is to be carried upon the automobile not shown and through the medium of the pipe 22 provides means for connecting the cylinders of the jacks on opposite sides of the center of the axle with the air supply. Flexible hose 24 is used to connect the ends of the pipe or head 22 with the jack cylinders.

In operation when it is desired to lower the jacks so that the automobile or vehicle may be raised the heads 17 of the latch bolts 15 are grasped and the latch bolts pulled out of registration with the slots 20 allowing the jacks to swing on their pivots 11 and into vertical position and in engagement with the ground. By forcing air into the cylinders of the jacks the piston is forced upwardly and will lift the automobile off of the ground. It will be readily seen that with my improved elevating means for automobiles, tires may be saved as when the automobile is not in use it may be easily jacked up and thus the weight of the car taken off of the tires. By gradually allowing the air to escape through the valve 13 the automobile may be lowered.

While I have shown only the front axle of an automobile provided with jacks it is to be understood that the rear axle is to be similarly equipped with jacks so that the lifting of the automobile may be easily effected. After using the jacks it is only necessary to force them upwardly and inwardly and they will automatically lock in horizontal up position.

In practice, I have found that the form of my invention, illustrated in the drawings and referred to in the above description as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

1. The combination with an automobile axle of jacks pivotally secured at their upper ends to said axle adjacent to the end thereof, base plates on said jacks, said axle having longitudinal slots therein on either side of the center thereof, said base plates being cut away adjacent certain edges to receive a portion of the axle, and spring pressed latch bolts mounted in opposite sides of the axle and arranged to extend into the slots to hold the jacks in out of the way position.

2. An automobile jack consisting of a base plate, lifting means mounted on the base plate, latch bolts mounted in one side of the base, and springs normally holding said latch bolts in extended position.

3. An automobile jack consisting of a base plate having a recess cut in one face thereof, lifting means carried by the base plate to be pivotally connected with the axle of an automobile and means carried on opposite sides of the recess in said base plate to automatically lock the base to the axle upon movement of the base into engagement therewith.

In testimony whereof I affix my signature in presence of two witnesses.

CHAS. R. SPALDING.

Witnesses:
PAUL BROWN,
GEO. T. DOWNEN.